3,091,618
PROCESS OF PREPARING METAL-CONTAINING PHTHALOCYANINE SULFONIC ACIDS
Maurice H. Fleysher, Buffalo, and Walter B. Richards, Hamburg, N.Y., assignors to Allied Chemical Corporation, New York, N.Y., a corporation of New York
No Drawing. Filed Dec. 27, 1960, Ser. No. 78,324
5 Claims. (Cl. 260—314.5)

This invention relates to an improved process for the production of metal-containing phthalocyanine sulfonic acids. More particularly it relates to the preparation of metal-containing phthalocyanine sulfonic acids in higher yields and of better quality than heretofore obtainable.

Metal-containing phthalocyanine sulfonic acids comprise an important group of dyestuff intermediates, and have recently been proposed for use in a process for the removal of sulfur compounds from hydrocarbon distillates.

Metal-containing phthalocyanine sulfonic acids, as is well known, can be prepared by the general process of dissolving the phthalocyanine in anhydrous sulfuric acid, e.g. oleum, and isolation of the sulfonated product by dilution of the reaction mass. The extent of sulfonation can be controlled by one or more of the following expedients:

(1) Varying the time of the sulfonation;
(2) Varying the temperature of the sulfonation;
(3) Altering the strength of the sulfonation media;
(4) Use of catalysts, e.g. mercuric sulfate.

By this general procedure sulfonated phthalocyanines have been obtained in relatively low yields or of such quality (i.e. poor color strength) that expensive, material consuming, and often tedious purifications have been required to obtain acceptable material. In particular, cobalt phthalocyanine sulfonic acids have been difficult to prepare in satisfactory yield and quality.

It is, therefore, an object of the present invention to provide an improved process for the sulfonation of metal-containing phthalocyanines.

Another object is to provide a process for the production of metal-containing phthalocyanine sulfonic acids in better yield and/or higher quality than heretofore.

A specific object of the present invention is to provide an improved process for the sulfonation of cobalt phthalocyanine.

Other objects will be apparent from the description which follows:

We have found that metal-containing phthalocyanine sulfonic acids can be obtained in higher yields and/or better quality than heretofore obtainable by reacting the metal-containing phthalocyanine with a substantially anhydrous sulfonating agent while excluding free oxygen, including the oxygen content of air, from contact with the sulfonation mass until the desired sulfonation has occurred, and thereafter isolating the sulfonated product as, for example, by drowning the acid solution in water and filtering the precipitated product. After the sulfonation is completed, the mass can be drowned in the presence of air without harmful results.

As sulfonating agents, sulfuric acid monohydrate, fuming sulfuric acid of various concentrations, chlorosulfonic acid followed by an alkaline hydrolysis of the sulfonic acid chloride and mixtures of these agents alone in the presence of suspending media such as dichlorobenzene, nitrobenzene, tetrachloroethane and the like can be used. The temperature the sulfonation is carried out at can be varied within wide limits; depending on the constitution of the starting metal-containing phthalocyanine and of the particular sulfonic acid product desired, the operation can be carried out at temperatures within the range of 0° C. to 200° C. The time of sulfonation depends also on the constitution of the starting material, the degree of sulfonation desired, the concentration of the sulfonating agent and the temperature of the sulfonation process.

In accordance with a preferred mode of carrying out the process of our invention, one part of cobalt phthalocyanine is added to 10 parts of 100% sulfuric acid in a vessel from which the air in free space above the acid has been replaced with carbon dioxide. The mixture is agitated at 15° to 20° C. until solution has occurred and then the mass is heated slowly to about 120° C. and agitated at that temperature until a sample of the reaction product is completely soluble in hot 10% aqueous sodium carbonate to which 2 cc. of pyridine have been added, per 10 cc. The mass is drowned in ice water and the sulfonation product is isolated and washed free of sulfate ions in a known manner.

By use of 26% oleum, the disulfo cobalt phthalocyanine can be prepared in a similarly improved manner, without the necessity of heating the reaction mixture to elevated temperatures.

The process of our invention is applicable to the production of any metal-containing phthalocyanine although the improvements obtained will vary from one metal phthalocyanine to another. Thus phthalocyanines in which the metal is copper, cobalt, nickel, iron, vanadium, zinc, or aluminum, can be sulfonated in an inert atmosphere to produce markedly higher yields and/or better quality metal-containing phthalocyanine sulfonic acids than would be produced by carrying out the sulfonation step as was heretofore conventional in an atmosphere containing free oxygen, i.e. air. Thus with cobalt phthalocyanine the improvements in both yields and quality of the sulfonic acids obtained in accordance with our invention is indeed striking, being about 25% increase in yield and about 20% to 30% increase in quality (as indicated by comparative strength). On the other hand, the improvements in yield obtained on sulfonating copper phthalocyanine in an inert atmosphere are less marked but still appreciable. In general, the improvement in the quality of copper phthalocyanine sulfonic acids obtained by our process is a most important feature.

While the explanation for the improvements effected by the present invention is not fully known, there is experimental evidence indicating that the sulfonation proceeds and goes to completion more readily in an inert or non-oxidizing atmosphere, thus resulting in an improvement in yield and in a sulfonation reaction mixture in which the free sulfuric acid is in such form that it is more readily separated from the metal phthalocyanine sulfonic acid during the subsequent washing step. This more complete removal of the free sulfuric acid results in a product of improved purity. This improvement in purity is demonstrated, for example, in the conversion of the copper phthalocyanine sulfonic acid to its guanidine salt. In the case of the reaction of copper phthalocyanine sulfonic acid prepared by heretofore known procedures, the guanidine phthalocyanine reaction product was found to be contaminated with white insoluble contaminants identified as guanidine sulfate, evidently produced by reaction of the guanidine with free sulfuric acid present in the sulfonated product. The copper phthalocyanine sulfonic acid produced by the process of our invention subjected to conventional washing, no more rigorous than that heretofore used, when reacted with guanidine produced a guanidine copper phthalocyanine reaction product which was essentially free of such contaminant, thus demonstrating that the metal-containing phthalocyanine sulfonic acids produced by the process of this invention are of improved purity.

The following examples will illustrate the process of our invention. Parts and percentages are by weight and temperatures are given in degrees centigrade.

Example I

A current of dry carbon dioxide gas was used to displace the air in the free space above 2180 parts of sulfuric acid (100% $H_2SO_4$) which had been cooled to 15°. To this acid, 218 parts of cobalt phthalocyanine was added during 3 hours and the mixture was agitated at 20° for about 6 hours, at the end of which period the color had dissolved completely. A steady current of carbon dioxide was passed into the reaction vessel during this period. Thereafter the solution was uniformly heated to 120° in 8 hours and maintained at 120°±1° until 2 drops of the sulfonation when boiled for 30 seconds in 10 cc. of 10% sodium carbonate became completely soluble on the addition of 2 cc. of pyridine. This required about 6 hours of heating at 120°. The mass was drowned in a mixture of about 5000 parts of ice and 2500 parts of water in about ¾ to 1 hour. About 3000 parts of ice and 5500 parts of water were added to the drowned mass which then was filtered. The filter cake was washed with cold water until only a trace of blue color was observed in the wash liquor. The cake was then washed with 1130 parts of 20° Bé. hydrochloric acid diluted with 32,800 parts of water until only a trace of sulfate ion was detectable in the washings. Finally the cake was washed with cold water until the wash liquor was substantially free of sulfate ion and of acid. The washed cake was dried. 213 parts of dried cake were obtained; this represents a yield of 93% of the theoretical amount of cobalt phthalocyanine monosulfonic acid obtainable.

For comparative purposes the above run was repeated using 200 parts of cobalt phthalocyanine and omitting the carbon dioxide; only 57 parts of a gummy product which was of questionable identity were obtained.

Example II

To 2500 parts of cold (10° to 15°) 26% oleum, 250 parts of cobalt phthalocyanine were added. A current of dry carbon dioxide gas was passed over the reaction mixture to displace the air in the free space thereabove and provide throughout the sulfonation an inert atmosphere, i.e., one free of oxygen. The mixture was warmed to 20° and agitated at 20° to 25° for 16 hours, warmed to 25° to 30° in 2 hours and agitated thereat for 2 hours.

The mass was drowned in a mixture of 8000 parts of ice and 2500 parts of water. The cold (0° to 5°) slurry was filtered and the filter cake was washed with cold water, then with 1% hydrochloric acid until the cake was substantially free of sulfate ions. The washed cake was washed with cold water until the wash liquor was tinged blue. The cake was dried at 100°±5°. There was thus produced 350 parts of cobalt phthalocyanine disulfonic acid of 120% to 130% in strength versus the strength of a reference sample.

For comparative purposes, the above run was repeated, using 2000 parts of 26% oleum and 200 parts of cobalt phthalocyanine and omitting the passage of the carbon dioxide stream over the reaction mass so that the sulfonation was conducted in the presence of atmospheric air in the free space above the reaction mass. There was produced 276 parts of cobalt phthalocyanine disulfonic acid which was of 90% strength versus the strength of the same reference sample as used in this Example II.

Example III

To 505 parts of sulfuric acid (100% $H_2SO_4$) at ambient temperature and in a reaction vessel which had been flushed out with carbon dioxide, 50 parts of cobalt phthalocyanine were added. The mixture was agitated for about 18 hours, as a steady flow of carbon dioxide was passed through the vessel, and the resulting solution was heated in 8 hours to and maintained at 140°±1° for 8 hours. The mass was drowned in ice and water and the slurry was filtered. The filter cake was washed with cold water, dilute hydrochloric acid until sulfate ion free, and finally with cold water until acid free. The washed cake was dried; 39.3 parts of excellent quality cobalt phthalocyanine disulfonic acid were thus obtained.

For comparative purposes, the above run was repeated, but omitting the flow of the carbon dioxide through the reaction vessel. There was thus obtained substantially the same amount of cobalt phthalocyanine disulfonic acid having a spectral strength markedly inferior to that produced in Example III. The spectral strength of the product produced in Example III was 138% compared with 100% for the spectral strength of the product produced in the comparative run.

Example IV

To an agitated mixture of 500 parts of 15% oleum and 2 parts of mercuric sulfate at 170° to 175°, and over which a current of carbon dioxide was continuously passed, 50 parts of copper phthalocyanine were slowly added. As soon as 2 drops of the reaction mass was completely soluble in 10 cc. of boiling 10% aqueous sodium carbonate, as indicated by absence of residue in the cooled solution, the mass was cooled quickly to about 25°, and drowned in 2000 parts of ice and 200 parts of water.

The resulting solution was filtered and the filtrate neutralized with soda ash. The product was identified as a solution of the tetrasodium salt of copper phthalocyanine tetrasulfonic acid by its absorption maximum at 665 mu. A total of 3540 parts (by volume) of solution was obtained.

Repetition of this experiment, but in an atmosphere from which air was not excluded, gave rise to considerable decomposition as evidenced by the glowing of the copper phthalocyanine particles during the charging thereof to the hot oleum. A total of 3000 parts (by volume) of solution was obtained.

The tetrasulfonation of copper phthalocyanine in the presence of an inert gas gave about 10% increase in yield and also an improvement in the quality of the product.

It will be noted that the process of this invention involving carrying out the sulfonation in an inert atmosphere results in a surprising and unexpected improvement in the yield and/or quality of the metal-containing phthalocyanine sulfonic acid.

Since certain changes in carrying out the above process may be made without departing from the scope or spirit of our invention, it is intended that all matter contained in the above description shall be interpreted as illustrative and not in a limiting sense.

What is claimed is:

1. In the process of preparing metal-containing phthalocyanine sulfonic acids which comprises the step of contacting the metal-containing phthalocyanine in which the metal is from the group consisting of copper, cobalt, nickel, iron, vanadium, zinc and aluminum with a substantially anhydrous sulfonating agent from the group consisting of sulfuric acid, fuming sulfuric acid, chlorosulfonic acid and mixtures of said acids at a temperature within the range of 0° C. to 200° C., the improvement which consists in maintaining the sulfonation mass in an inert atmosphere during the sulfonation.

2. The process of sulfonating metal-containing phthalocyanines which comprises heating a reaction mass containing metal phthalocyanine in which the metal is from the group consisting of copper, cobalt, nickel, iron, vanadium, zinc and aluminum and substantially anhydrous sulfonating agent from the group consisting of sulfuric acid, fuming sulfuric acid, chlorosulfonic acid and mixtures of said acids at a temperature within the range of 0° C. to 200° C. until the desired extent of sulfonation has taken place, while maintaining the reaction mass in an atmosphere substantially devoid of free oxygen, and isolating the metal-containing phthalocyanine sulfonic acid from the reaction mass.

3. The process of sulfonating metal-containing phthalocyanines in which the metal is from the group consisting of copper, cobalt, nickel, iron, vanadium, zinc and aluminum which comprises mixing the metal-containing phthalocyanine with a substantially anhydrous sulfonating agent from the group consisting of sulfuric acid, fuming sulfuric acid, chlorosulfonic acid and mixtures of said acids, passing an inert gas through the free space above the reaction mass to displace the air in said free space, heating to a temperature within the range of 0° C. to 200° C. the resulting mixture while continuing the passage of the inert gas stream through said free space until the desired extent of sulfonation has occurred, thereafter discontinuing the flow of inert gas and drowning the acid solution in water, and filtering the resultant slurry to separate the metal-containing phthalocyanine sulfonic acid from the aqueous phase.

4. The process of sulfonating metal-containing phthalocyanines in which the metal is from the group consisting of copper, cobalt, nickel, iron, vanadium, zinc and aluminum which comprises mixing the metal-containing phthalocyanine with substantially anhydrous sulfuric acid, passing an inert gas through the free space above the reaction mass to displace the air in said free space, heating to a temperature within the range of 0° C. to 200° C. the resulting mixture while continuing the passage of the inert gas stream through said free space until the desired extent of sulfonation has occurred, thereafter discontinuing the flow of inert gas and drowning the acid solution in water, and filtering the resultant slurry to separate the metal-containing phthalocyanine sulfonic acid from the aqueous phase.

5. The process as defined in claim 4, in which the metal-containing phthalocyanine is cobalt phthalocyanine.

References Cited in the file of this patent
UNITED STATES PATENTS

| | | |
|---|---|---|
| 2,613,128 | Baumann et al. | Oct. 7, 1952 |
| 2,917,518 | Merner | Dec. 15, 1959 |

OTHER REFERENCES

Lubs: Chemistry of Synthetic Dyes and Pigments (1955), pages 594 and 595.